United States Patent [19]
Nomura et al.

[11] Patent Number: 5,640,615
[45] Date of Patent: Jun. 17, 1997

[54] ROTARY FEED MECHANISM FOR LENS BARREL OF COMPACT ZOOM CAMERA

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 541,969

[22] Filed: Oct. 10, 1995

[30] Foreign Application Priority Data

Oct. 13, 1994 [JP] Japan ................................. 6-247862

[51] Int. Cl.⁶ .................... G03B 1/18; G02B 7/02
[52] U.S. Cl. .................................. 396/72; 359/704
[58] Field of Search ........................... 396/72, 79, 80; 359/676, 694, 696–699, 703, 704, 826; 74/89.15, 89.16, 89.17

[56] References Cited

U.S. PATENT DOCUMENTS

| | | | |
|---|---|---|---|
| 4,252,411 | 2/1981 | Nomura | 359/825 |
| 5,144,493 | 9/1992 | Nomura | 396/75 X |
| 5,164,757 | 11/1992 | Nomura | 396/80 X |
| 5,386,740 | 2/1995 | Nomura et al. | 359/704 X |
| 5,446,593 | 8/1995 | Hamasaki et al. | 359/704 |
| 5,488,513 | 1/1996 | Tanaka | 359/704 X |

FOREIGN PATENT DOCUMENTS

| | | |
|---|---|---|
| 0344806 | 12/1989 | European Pat. Off. |
| 0574826 | 12/1993 | European Pat. Off. |
| 0609911 | 8/1994 | European Pat. Off. |
| 2259977 | 3/1993 | United Kingdom. |

*Primary Examiner*—Howard B. Blankenship
*Attorney, Agent, or Firm*—Greenblum & Bernstein P.L.C.

[57] ABSTRACT

A rotary feed mechanism includes inner and outer annular members which are engaged through male and female multiple threads. A circumferential engaging land is formed on an outer peripheral surface of the inner annular member. A plurality of inclined gears are inclined in the same direction as the male multiple thread and formed on the engaging land. At least one thread, which constitutes a part of the male multiple thread, is provided between each of the inclined gears. A plurality of pinion shafts are arranged in parallel with an axis of the inner and outer annular members and rotate the inner annular member with respect to the outer annular member. A plurality of separate pinions are provided on each pinion shaft. The pinions have a width which successively engages the inclined gears in accordance with the axial position of the inner annular member. A mechanism drives the pinion shafts in the same direction. The pinion shafts are offset along the optical axis, so that the inclined gears can engage the pinions on at least one of the shafts regardless of the axial position of the inner annular member.

12 Claims, 3 Drawing Sheets

ROTARY FEED MECHANISM FOR LENS BARREL OF COMPACT ZOOM CAMERA

BACKGROUND OF THE INVENTION

1. Field of the Invention

The present invention relates to a rotary feed mechanism which can be advantageously used for a zoom lens barrel or the like.

2. Description of Related Art

In recent compact cameras having a zoom lens, a lens barrel, which is normally retracted in the camera body, is advanced to project from the camera body only when it is used. In order to reduce the overall length of the camera body, it is necessary to accommodate the lens barrel to thereby realize a thin and compact camera.

In such zoom compact cameras hitherto known, a movable lens barrel, which constitutes a part of a lens barrel, is screw-engaged by a stationary ring secured to the camera body through male and female multiple threads, so that the movable lens barrel can be moved with respect to the stationary ring. The movable lens barrel is provided on the outer peripheral surface thereof with a circumferentially extending engaging land which is provided thereon with the above-mentioned male multiple thread, inclined gears having a plurality of threads which are inclined in the same direction as the male multiple thread, and a single thread which constitutes a part of the male multiple thread being provided between the inclined gears. The camera is also provided with a series of gears having a plurality of pinions of small width which are secured to a common shaft and successively engaged by the inclined gears. When the series of gears are rotated, the movable lens barrel is rotated relative to the stationary ring to move in the forward or backward direction.

In conventional zoom compact cameras as mentioned above, the thread width of the inclined gears in the optical axis direction of the movable lens barrel is long enough to always engage with any one of the small width pinions, regardless of the axial position of the movable lens barrel. However, in order to increase the length of projection of the movable lens barrel from the camera body, it is necessary to reduce the thread width of the inclined gears in the optical axis direction. If the width of the inclined gears is minimized, the width of engagement between the small width pinions and the inclined gears is also reduced. In the worst case scenario, no inclined gear can engage with the small width pinions.

SUMMARY OF THE INVENTION

It is an object of the present invention to provide an improved rotary feed mechanism in which the engagement of the inclined gears with a series of gears can be ensured even if the thread width of the inclined gears is reduced to increase the projection (feed) distance of an inner annular member.

To achieve the object mentioned above, according to the present invention, there is provided a rotary feed mechanism having, inner and outer annular members which engage through male and female multiple threads. A circumferential engaging land is formed on an outer peripheral surface of the inner annular member. A plurality of inclined gears are inclined in the same direction as the male multiple thread and which are formed on the engaging land. A least one thread, which constitutes a part of the male multiple thread, is provided between each of the inclined gears. A plurality of pinion shafts are arranged in parallel with an axis of the inner and outer annular members and rotates the inner annular member with respect to the outer annular member. A plurality of separate pinions are provided on each pinion shaft. The pinions have a width that can be successively engaged by the inclined gears in accordance with the axial position of the inner annular member. A mechanism drives the pinion shafts in the same direction. The pinion shafts are offset along the optical axis so that the inclined gears can be engaged by at least one of the pinions, regardless of the axial position of the inner annular member.

Preferably, there are a pair of pinion shafts engaged by a common drive pinion which constitutes the drive mechanism. When the drive pinion rotates, the pinion shafts are rotated in the same direction and at the same speed.

The distance between the pinions of each pinion shaft is preferably substantially identical to the width of the engaging land along the optical axis.

In another aspect of the present invention, a rotary feed mechanism of a camera is provided. A stationary ring having a female multiple thread formed on an inner periphery of the stationary ring. A movable lens barrel has a male multiple thread formed on its outer periphery. The male multiple thread is engaged with the female multiple thread. A plurality of sectional gears are formed on the outer periphery of the movable lens barrel inclined with respect to an axis of the movable lens barrel and extending along the male multiple thread. A pair of shafts extending in the axial direction and having a plurality of pinions engaged with the plurality of sectional gears. The plurality of pinions are formed at regular intervals on each of the pair of shafts such that a distance between the plurality of pinions of each of the pair of shafts is substantially identical to a width of the plurality of sectional gears, in the axial direction. A drive pinion is engaged with one pinion from each of the plurality of pinions, of the pair of shafts. The pair of shafts are rotated in a same rotational direction at a same speed when the drive pinion rotates.

The pair of shafts are preferably placed such that the plurality of pinions on one of the pair of shafts and the plurality of pinions on the other of the pair of shafts are alternately placed in the axial direction of the movable lens barrel.

According to still another aspect of the present invention, there is provided a rotary feed mechanism having, an annular member. A circumferential engaging land is formed on an outer peripheral surface of the annular member. A plurality of inclined gears are inclined in the same direction with respect to a circumferential direction of the annular member and are formed on the engaging land. A plurality of pinion shafts are arranged in parallel with an axis of the annular member and rotate the annular member. A plurality of separate pinions are provided on each pinion shaft. The pinions have a width that can be successively engaged by the inclined gears in accordance with the axial position of the annular member. A mechanism drives the pinion shafts in the same direction. The pinion shafts are offset along the optical axis, so that the inclined gears can be engaged by at least one pinion, regardless of the axial position of the annular member.

The present disclosure relates to subject matter contained in Japanese Patent Application No. 6-247862 (filed on Oct. 13, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
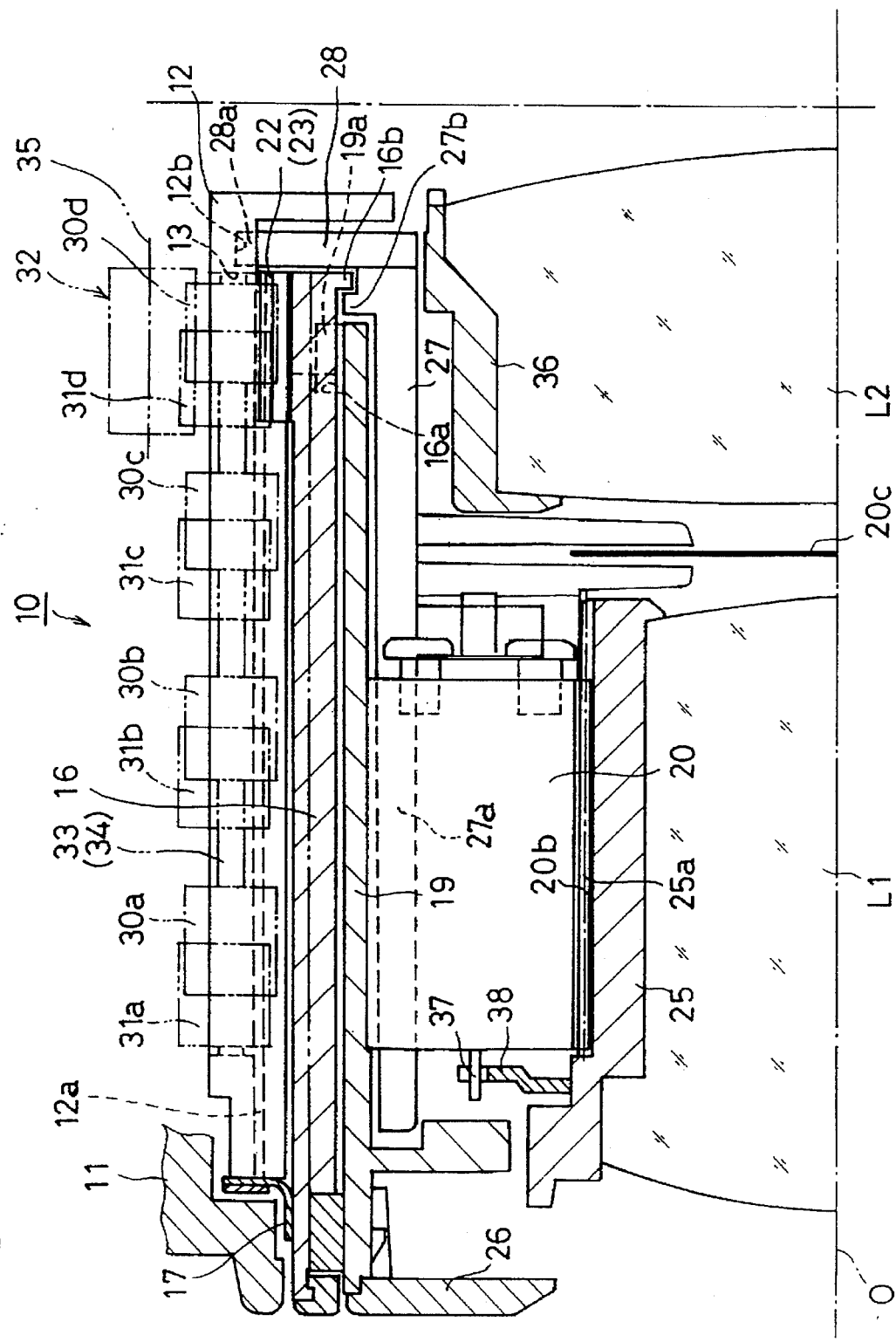
FIG. 1 is a sectional view of an upper half of a zoom lens barrel having a rotary feed mechanism according to the present invention.

According to the present invention, a zoom lens barrel 10 is comprised of two movable lens groups, namely, a first lens group L1 and a second lens group L2. In the zoom lens barrel 10, the zooming is carried out by moving the first and second lens groups L1 and L2 in accordance with predetermined loci. Focusing is carried out by moving the first lens group L1 without any movement of the second lens group L2. The drive mechanism which drives the second lens group L2 is not shown.

A stationary block 11 secured to a camera body is provided with a stationary ring 12 (outer annular member) secured thereto by a securing means per se known (not shown). The stationary ring 12 is provided with a gear insertion groove 13 of predetermined width which extends in the axial direction. The stationary ring 12 is provided on the front end thereof with an annular flexible light intercepting film 17 whose front end is bent to extend in the axial direction. The flexible light intercepting film 17 is in contact with the outer peripheral surface of a first movable lens barrel (inner annular member) 16 which is inserted in the stationary ring 12 so as to rotate and move in the optical axis direction; this prevents light from entering a clearance between the stationary ring 12 and the first movable lens barrel 16.

The first movable lens barrel 16 is provided, on the outer peripheral surface of the rear end thereof, with a circumferentially extending engaging land L. The engaging land L is provided with a multiple thread (male screw) 22 which is engaged by a multiple thread (female screw) 12a formed on the inner peripheral surface of the stationary ring 12, and inclined gears (sectional gears) 23' having a plurality of threads (i.e., one (row of)) referred to as one group of teeth 23a parallel with the optical axis O). The inclined gears 23 are inclined in the same direction as the multiple thread 22. Threads 22a of the male screw 22 are each provided between the inclined gears 23. The threads (male screw) 22a prevent the first movable lens barrel 16 from inclining with respect to the stationary ring 12.

The inclined gears 23, which mesh with a series of gears 30 and 31 (which will be discussed hereinafter), are arranged in the circumferential direction within a predetermined angular limit about the optical axis O of the first movable lens barrel 16. In the illustrated embodiment, the five inclined gears 23, consisting of a group of teeth 23a extending in the direction parallel with the optical axis O, are formed in five cut-away portions formed in each row of the multiple thread 22 within a predetermined angular limit in the circumferential direction of the first movable lens barrel 16. The teeth 23a of each inclined gear 23 are continuously connected in the circumferential direction.

Figure 2:
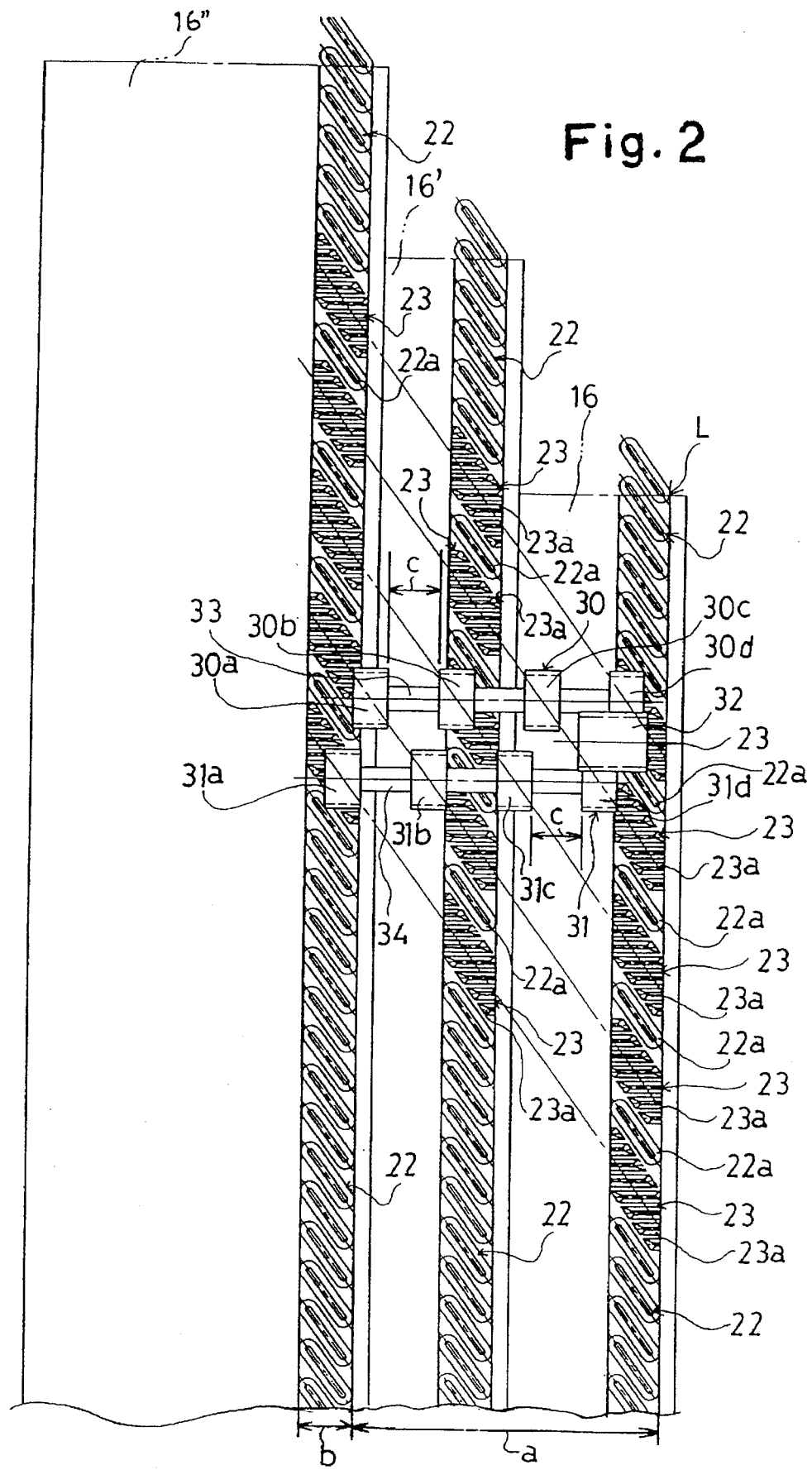
FIG. 2 is a developed view of a first movable lens barrel to explain operations of the rotary feed mechanism shown in FIG. 1; and, FIG. 3 is a back view of a rotary feed mechanism as viewed from the back of a camera.
Figure 3:
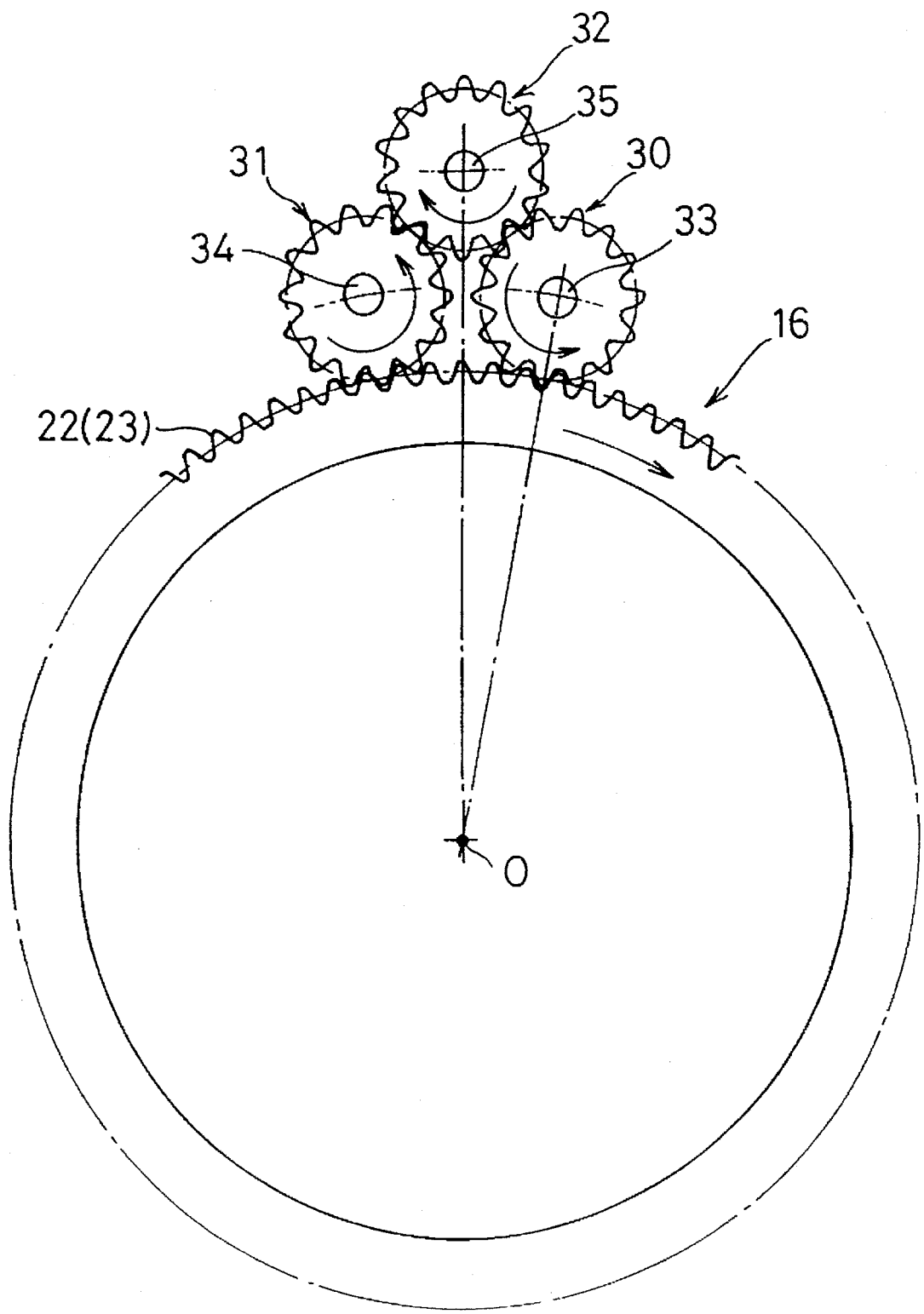

The stationary ring 12 rotatably supports a pair of first and second multiple gears 30 and 31 arranged in the gear insertion groove 13. As can be seen in FIGS. 1 through 3, the first and second multiple gears 30 and 31 are constructed such that the distance between the end pinions 30a and 30d, and the distance between the end pinions 31a and 31d are substantially identical to the displacement "a" of the inclined gears 23 of the first movable lens barrel 16 in the optical axis direction. The multiple gears 30 and 31 are provided with pinion shafts 33 and 34 which rotate the first movable lens barrel 16 with respect to the stationary ring 12, and which extend in parallel with the optical axis O. Small width pinions 30a, 30b, 30c, 30d are and 31a, 31b, 31c, 31d, secured to the pinion shafts 33, 34 to successively engage with the inclined gears 23 in accordance with the axial position of the first movable lens barrel 16, respectively. The distance "c" of the adjacent pinions 30a, 30b, 30c, 30d and the distance "c" of the adjacent pinions 31a, 31b, 31c, 31d are substantially equal to the width "b" of the engaging land L in which the multiple thread 22 and the inclined gears 23 are formed, in the optical axis direction.

The positions of the pinions 30a through 30d of the multiple gear 30 and the pinions 31a through 31d of the multiple gear 31 are offset in the optical axis direction, such that any of the pinions 30a through 30d or 31a through 31d engage the inclined gears 23, regardless of the axial position of the first movable lens barrel 16. Namely, the pinions 30a through 30d and 31a through 31d are located in a zigzag arrangement in the optical axis direction, apart equally along the circumference of lens barrel 19 regardless of the axial position of the first movable lens barrel 16. This contact includes an accommodated position in which lens barrel 16 is fully retracted in the camera body, an intermediate position 16' in which the first movable lens barrel intermediately projects from the camera body, and a most projected or advanced position 16" in which the first movable lens barrel is projected furthest from the camera body.

There are stepped portions defined between the adjacent pinions 30a, 30b, 30c and 30d, due to the difference in the diameter between the pinion shaft 33 and the pinions. The male threads 22a of the male screw 22, provided between the adjacent inclined gears 23, can pass through the stepped portions without coming into contact therewith. Similarly, the male threads 22a of the male screw 22, provided between the adjacent inclined gears 23, can pass through the stepped portions defined between the adjacent pinions 31a, 31b, 31c and 31d, due to the difference in the diameter between the pinion shaft 34 and the pinions, without coming into contact with the pinions.

The stationary block 11 is provided with a rotatable shaft 35 which supports a drive pinion 32. Drive pinion 32 meshes with both the rear end pinions 30d and 31d of the first and second multiple gears 30 and 31. The pinions 30d and 31d are close to each other in the optical axis and in the circumferential direction. The drive pinion 32 is rotated by a drive motor (not shown) provided on the camera body. Rotation of the drive pinion 32 transmits to the first and second multiple gears 30 and 31 through the end pinions 30d and 31d, thereby rotating the gears 30 and 31 in the same direction and at the same speed.

A second movable lens barrel 19 is rotatably supported in the first movable lens barrel 16. The second movable lens barrel 19 is provided, on the outer peripheral surface of the rear end thereof, with a plurality of engaging projections 19a which are spaced apart equally along the circumference of lens barrel 19. The engaging projections 19a engage in a helical cam groove 16a formed on the inner peripheral surface of the first movable lens barrel 16.

The second movable lens barrel 19 is provided with an annular AF/AE unit 20 secured to the inner peripheral surface thereof. The AF/AE unit 20 is provided on the rear end portion thereof with shutter blades 20c. The AF/AE unit 20 is also provided on the inner peripheral surface thereof with a female helicoid 20b. Helicoid 20b meshes with a male helicoid 25a formed on the outer peripheral surface of a lens supporting frame 25 which holds the first lens group L1. The AF/AE unit 20 also has a drive pin 37 driven in the circumferential direction by an angular displacement in accordance with object distance data. The drive pin 37 engages with an association arm 38 which projects from the lens supporting frame 25 in the radial direction. Consequently, the lens supporting frame 25 (of the first lens group L1) focuses by moving in the direction of the optical axis O, in accordance with the angular displacement of the drive pin 37 and the lead of the helicoids 20b and 25a. Also, the AF/AE unit 20 opens and closes the shutter blades 20c in accordance with object brightness data.

The second movable lens barrel 19 is provided on the inner peripheral surface thereof with a linear movement guide ring 27 having a guide rail 27a which is slidably inserted in a guide portion provided between the second movable lens barrel 19 and the AF/AE unit 20. The linear movement guide ring 27 is provided on the rear end thereof with an outer peripheral flange 27b. The first movable lens barrel 16 is provided on the rear end thereof with an inner peripheral flange 16b. The linear movement guide ring 27 is provided on the rear end thereof with a linear movement guide plate 28 secured thereto by a screw (not shown), so that the inner peripheral flange 16b is located between the linear movement guide plate 28 and the outer peripheral flange 27b. The linear movement guide plate 28 has a plurality of engaging projections 28a which project outward in radial directions. The engaging projections 28a are slidably engaged in a linear movement guide groove 12b, formed on the inner peripheral surface of the stationary ring 12, to restrict the relative rotation between the linear movement guide ring 27 and the stationary ring 12.

With this arrangement, the first movable lens barrel 16 is movable in the optical axis direction together with the linear movement guide ring 27 and the linear movement guide plate 28, and is rotatable relative to the linear movement guide ring 27 or the linear movement guide plate 28. The second movable lens barrel 19 is fixed rotatably relative to the stationary ring 12 and is linearly movable in the optical axis direction. Namely, the axial movement of the second movable lens barrel 19 takes place through the engagement of the engaging projections 19a with the cam groove 16a of the first movable lens barrel 16.

A lens supporting frame 36' which holds the second lens group L2 is provided with a guide pin (not shown) which engages a cam groove of predetermined shape formed in the inner peripheral surface of the first movable lens barrel 16. Consequently, the lens supporting frame 36 (second lens group L2) is moved in the optical axis direction while maintaining a predetermined relationship with respect to the first lens group L1, when the first movable lens barrel 16 rotates. Note that numeral 26 in FIG. 1 designates the cylindrical lens cover which is provided at the front end of the second movable lens barrel 19.

The zoom lens barrel 10 operates as follows when the drive motor (not shown) is rotated. Namely, when the drive pinion 32 is rotated by the drive motor, for example in the clockwise direction in FIG. 3, the pinions 30d and 31d are rotated in the counterclockwise direction. Consequently, the first and second multiple gears 30 and 31 are rotated in the counterclockwise direction. As a result, the rotation of the first and second multiple gears 30 and 31 transmits to the first movable lens barrel 16 through the inclined gears 23 as a rotation in the clockwise direction.

When the first movable lens barrel 16 is rotated in the clockwise direction, it moves along the optical axis from the accommodated position shown in FIG. 2 toward the most projected position through the engagement of the male multiple thread 22 and the female multiple thread 12a of the stationary ring 12. During the advance of the first movable lens barrel 16, the inclined gears 23 are engaged by any of the pinions 30a, 30b, 30c, 30d or 31a, 31b, 31c, 31d, which are located in a staggered arrangement in the optical axis direction. Consequently, if the width of the engaging land L in the optical axis direction is minimized so as to project the first movable lens barrel 16 as far as possible from the camera body, the inclined gears 23 will engage either the multiple gear 30 or 31. The same is true when the first movable lens barrel 16 is moved from the projected position toward the accommodated position.

When the rotation of the first movable lens barrel 16 occurs, the second movable lens barrel 19' whose engaging projections 19a are engaged in the cam groove 16a formed on the inner peripheral surface of the first movable lens barrel 16, and the lens supporting frame 36 which is provided with the guide pin engaged in the cam groove (not shown) formed on the inner peripheral surface of the first movable lens barrel 16, are moved in the optical axis direction O, while keeping a predetermined relative relation. Thus, the first and second lens groups L1 and L2 are advanced in the optical axis direction to vary the spatial distance therebetween, thereby effecting the zooming operation.

After zooming is complete, the AF/AE unit 20 drives the drive pin 37 in the circumferential direction by an angular displacement corresponding to object distance data to advance the first lens group L1 in the optical axis direction O to focus operation, and opens or closes the shutter blades 20c in accordance with object luminance data at a predetermined time.

As can be understood from the above discussion, according to the present invention, there are a plurality of parallel pinion shafts which are each provided with pinions of small width that are spaced and aligned in the axial direction of the pinion shaft so that the axial arrangement of the pinions of the pinion shaft is shifted in the optical axis direction from the axial arrangement of the pinions of the adjacent pinion shaft, whereby the inclined gears can be always engaged by any of the pinions. Moreover, the pinion shafts are driven at the same rotational speed by the drive means. Consequently, if the width of the engaging land L in the optical axis direction is minimized to increase the amount of projection of the first movable lens barrel 16 from the camera body, it is ensured that the inclined gears 23 are always engaged by the multiple gear 30 or 31.

Although the invention has been described with reference to particular means, materials and embodiments, it is to be understood that the invention is not limited to the particulars disclosed and extends to all equivalents within the scope of the claims.

What is claimed is:

1. A rotary feed mechanism, comprising:
   inner and outer annular members which are engaged through male and female multiple threads on said inner and outer annular members, respectively;
   a circumferential engaging land formed on an outer peripheral surface of said inner annular member;
   a plurality of inclined gears, inclined in a same direction as said male multiple thread, formed on said engaging land;

at least a portion of said male multiple thread being provided between each of said plurality of inclined gears;

a plurality of pinion shafts, arranged in parallel with an axis of said inner and outer annular members, which rotate said inner annular member with respect to said outer annular member;

a plurality of sets of separate pinions provided on each of said plurality of pinion shafts, respectively, said each of said separate pinions having a width that can successively engage said plurality of inclined gears in accordance with the axial position of said inner annular member; and, means for driving said plurality of pinion shafts in the same direction;

wherein said plurality of pinion shafts are offset in an optical axis direction, so that said inclined gears can be engaged by at least one of said separate pinions regardless of an axial position of said inner annular member.

2. A rotary feed mechanism according to claim 1, wherein said drive means comprises a common drive pinion, common to said plurality of pinion shafts.

3. A rotary feed mechanism according to claim 2, wherein a pair of pinion shafts are engaged by said common drive pinion of said drive means, so that when said drive pinion rotates, said pair of pinion shafts are rotated in a same direction and at a same speed.

4. A rotary feed mechanism according to claim 1, wherein a distance between each of said plurality of separate pinions of each of said plurality of pinion shafts is substantially identical to a width of said engaging land in the direction of the optical axis.

5. A rotary feed mechanism according to claim 1, wherein said inner annular member is a movable lens barrel which constitutes a lens barrel of a camera, said movable lens barrel engaging said outer annular member through said male and female multiple threads.

6. A rotary feed mechanism according to claim 5, wherein said plurality of pinion shafts are provided with the same number of pinions.

7. A rotary feed mechanism according to claim 6, wherein said pinions on said plurality of pinion shafts engage with the inclined gears, regardless of the axial position of said movable lens barrel.

8. A rotary feed mechanism according to claim 7, wherein a distance between end pinions of each said plurality of pinion shafts is substantially identical to the displacement of said inclined gears of said movable lens barrel in the optical axis direction.

9. A rotary feed mechanism according to claim 7, wherein said male multiple thread can pass through a stepped portion defined between said plurality of separate pinions without contacting said plurality of separate pinions.

10. A rotary feed mechanism of a camera, comprising:

a stationary ring having a female multiple thread formed on an inner periphery of said stationary ring;

a movable lens barrel, having a male multiple thread formed on an outer periphery of said movable lens barrel, said male multiple thread engaging said female multiple thread;

a plurality of sectional gears formed on said outer periphery of said movable lens barrel, said plurality of sectional gears being inclined with respect to an axial direction of said movable lens barrel and extending along said male multiple thread;

a pair of shafts, extending in said axial direction, and each having a plurality of pinions engaged with said plurality of sectional gears and each of said plurality of pinions being positioned on each of said pair of shafts such that a distance between adjacent ones of said plurality of pinons being substantially identical to a width of said plurality of sectional gears, in said axial direction;

a drive pinion engaging one pinion of each of said plurality of pinions; and, said pair of shafts are rotated in a same rotational direction at a same speed when said drive pinion rotates.

11. A rotary feed mechanism of a camera according to claim 10, wherein said plurality of pinions on one of said pair of shafts and said plurality of pinions of the other of said pair of shafts are alternately placed in said axial direction of said movable lens barrel.

12. A rotary feed mechanism comprising:

an annular member;

a circumferential engaging land formed on an outer peripheral surface of said annular member;

a plurality of inclined gears, inclined in the same direction with respect to a circumferential direction of the annular member and formed on said engaging land;

a plurality of pinion shafts, arranged in parallel with an axis of said annular member, and which rotate said annular member;

a plurality of separate pinions provided on each of said plurality of pinion shafts, each of said plurality of pinions having a width that can successively engage said plurality of inclined gears in accordance with the axial position of said annual member;

means for driving said plurality of pinion shafts in the same direction;

wherein said plurality of pinions shafts are offset in a direction of an optical axis, so that said inclined gears engage at least one of said plurality of pinions on at least one of said pinion shafts, regardless of the axial position of said annular member.

* * * * *

UNITED STATES PATENT AND TRADEMARK OFFICE
CERTIFICATE OF CORRECTION

PATENT NO. : 5,640,615
DATED : June 17, 1997
INVENTOR(S) : H. NOMURA et al.

It is certified that error appears in the above-identified patent and that said Letters Patent is hereby corrected as shown below:

At column 7, line 21 (claim 2, line 2), delete "common".

Signed and Sealed this

Nineteenth Day of January, 1999

Attest:

*Attesting Officer*

*Acting Commissioner of Patents and Trademarks*